US009761063B2

(12) United States Patent
Lambert et al.

(10) Patent No.: US 9,761,063 B2
(45) Date of Patent: Sep. 12, 2017

(54) SERVER DETERMINED BANDWIDTH SAVING IN TRANSMISSION OF EVENTS

(71) Applicant: Lytx, Inc., San Diego, CA (US)

(72) Inventors: Daniel Lambert, Carlsbad, CA (US); Joshua Donald Botnen, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 327 days.

(21) Appl. No.: 13/736,842

(22) Filed: Jan. 8, 2013

(65) Prior Publication Data

US 2014/0195105 A1 Jul. 10, 2014

(51) Int. Cl.
*G01M 17/00* (2006.01)
*G06F 7/00* (2006.01)
*G07C 5/00* (2006.01)
*G07C 5/08* (2006.01)

(52) U.S. Cl.
CPC ............... *G07C 5/008* (2013.01); *G07C 5/08* (2013.01)

(58) Field of Classification Search
USPC ........................................... 701/1, 32.2–34.1
See application file for complete search history.

(56) References Cited

U.S. PATENT DOCUMENTS

| | | | |
|---|---|---|---|
| 4,853,859 A | 8/1989 | Morita et al. | |
| 4,992,943 A | 2/1991 | McCracken | |
| 5,497,419 A * | 3/1996 | Hill | 380/200 |
| 5,689,442 A * | 11/1997 | Swanson et al. | 380/241 |
| 5,815,093 A * | 9/1998 | Kikinis | 340/937 |
| 6,141,611 A * | 10/2000 | Mackey et al. | 701/32.2 |
| 6,298,290 B1 | 10/2001 | Abe et al. | |
| 6,389,340 B1 * | 5/2002 | Rayner | 701/32.4 |
| 6,865,457 B1 | 3/2005 | Mittelsteadt et al. | |
| 6,898,492 B2 | 5/2005 | Leon et al. | |
| 7,024,255 B1 * | 4/2006 | Brown et al. | 700/56 |
| 7,043,343 B1 * | 5/2006 | Houlberg et al. | 701/1 |
| 7,103,460 B1 * | 9/2006 | Breed | 701/32.9 |
| 7,313,467 B2 * | 12/2007 | Breed et al. | 701/1 |
| 7,317,974 B2 * | 1/2008 | Luskin et al. | 701/31.5 |
| 7,859,392 B2 | 12/2010 | McClellan et al. | |
| 8,054,196 B2 * | 11/2011 | Hilliar Isaacson | 340/686.6 |
| 2001/0005804 A1 * | 6/2001 | Rayner | 701/35 |
| 2002/0029109 A1 | 3/2002 | Wong et al. | |
| 2002/0183905 A1 | 12/2002 | Maeda et al. | |
| 2004/0008255 A1 | 1/2004 | Lewellen | |
| 2004/0054513 A1 | 3/2004 | Laird et al. | |
| 2004/0236474 A1 * | 11/2004 | Chowdhary et al. | 701/1 |
| 2005/0060071 A1 | 3/2005 | Winner | |
| 2005/0131585 A1 * | 6/2005 | Luskin et al. | 701/1 |
| 2005/0137757 A1 | 6/2005 | Phelan et al. | |
| 2006/0092043 A1 | 5/2006 | Lagassey | |
| 2007/0100519 A1 | 5/2007 | Engel | |
| 2007/0135979 A1 * | 6/2007 | Plante | 701/35 |
| 2007/0136078 A1 * | 6/2007 | Plante | 705/1 |
| 2007/0173994 A1 * | 7/2007 | Kubo et al. | 701/35 |

(Continued)

*Primary Examiner* — Bhavesh V Amin
(74) *Attorney, Agent, or Firm* — Van Pelt, Yi & James LLP

(57) ABSTRACT

A system for receiving a driving event comprises an interface and a processor. An interface is configured to receive a portion of data regarding a driving event. A processor is configured to determine whether more data regarding the driving event should be requested and, in the event that more data regarding the driving event should be requested, request more data regarding the driving event.

18 Claims, 6 Drawing Sheets

(56) References Cited

U.S. PATENT DOCUMENTS

| | | | | |
|---|---|---|---|---|
| 2007/0257781 | A1* | 11/2007 | Denson | 340/425.5 |
| 2007/0260361 | A1* | 11/2007 | Etcheson | 701/1 |
| 2008/0059055 | A1 | 3/2008 | Geelen et al. | |
| 2008/0111666 | A1* | 5/2008 | Plante et al. | 340/425.5 |
| 2008/0252487 | A1* | 10/2008 | McClellan | G01S 5/0027 340/936 |
| 2008/0319604 | A1* | 12/2008 | Follmer et al. | 701/35 |
| 2010/0023206 | A1* | 1/2010 | Paquette et al. | 701/35 |
| 2010/0250021 | A1 | 9/2010 | Cook et al. | |
| 2011/0035139 | A1 | 2/2011 | Konlditslotis et al. | |
| 2011/0077028 | A1 | 3/2011 | Wilkes et al. | |
| 2011/0130916 | A1 | 6/2011 | Mayer | |
| 2011/0213526 | A1 | 9/2011 | Giles et al. | |
| 2011/0234749 | A1 | 9/2011 | Alon | |
| 2011/0238543 | A1 | 9/2011 | Paez et al. | |
| 2012/0071140 | A1 | 3/2012 | Oesterling et al. | |
| 2012/0303254 | A1 | 11/2012 | Kirsch et al. | |
| 2013/0006469 | A1 | 1/2013 | Green et al. | |
| 2013/0047039 | A1 | 2/2013 | Manes et al. | |
| 2013/0266185 | A1 | 10/2013 | Bulan et al. | |
| 2014/0195105 | A1* | 7/2014 | Lambert et al. | 701/33.4 |

* cited by examiner

500

Exception Database

Location-Specific Legal Information Exceptions (502)

| Type | Map Segment | Location | Exception |
|---|---|---|---|
| Speed | 0007 | All | 55 MPH |
| Speed | 0012 | 10 -> 12 | 65 MPH |
| Stop | 0009 | 15.1 | No Stop |

Customer-Specific Event Exceptions (504)

| Type | Exception |
|---|---|
| Speed | + 10 MPH |
| Shock | - 15 $m/s^2$ |

Customer-Specific Region Exceptions (506)

| Map Segment | Location |
|---|---|
| 0014 | All |
| 0001 | 55 -> End |

Fig. 5

SERVER DETERMINED BANDWIDTH SAVING IN TRANSMISSION OF EVENTS

BACKGROUND OF THE INVENTION

Modern vehicles (e.g., airplanes, boats, trains, cars, trucks, etc.) can include a vehicle event recorder in order to better understand the timeline of an anomalous event (e.g., an accident). A vehicle event recorder typically includes a set of sensors, e.g., video recorders, audio recorders, accelerometers, gyroscopes, vehicle state sensors, GPS (global positioning system), etc., that report data, which is used to determine the occurrence of an anomalous event. If an anomalous event is detected, the sensor data related to the event is stored for later review. A vehicle event recorder for cars and trucks (e.g., vehicles that operate on public roads) can include road map data comprising location-specific legal information (e.g., speed limit information, stop sign information, traffic light information, yield sign information, etc.). Location-specific legal information can be used to identify an anomalous event in the case of the vehicle acting against the law (e.g., traveling in excess of the speed limit, rolling through a stop sign, etc.). If there is an error in the legal information, anomalous events can be incorrectly identified, possibly leading to unnecessary expense as the event is processed, stored, and/or transmitted.

BRIEF DESCRIPTION OF THE DRAWINGS

Various embodiments of the invention are disclosed in the following detailed description and the accompanying drawings.

FIG. 5 is a diagram illustrating an embodiment of an exception database.

DETAILED DESCRIPTION

Figure 1:
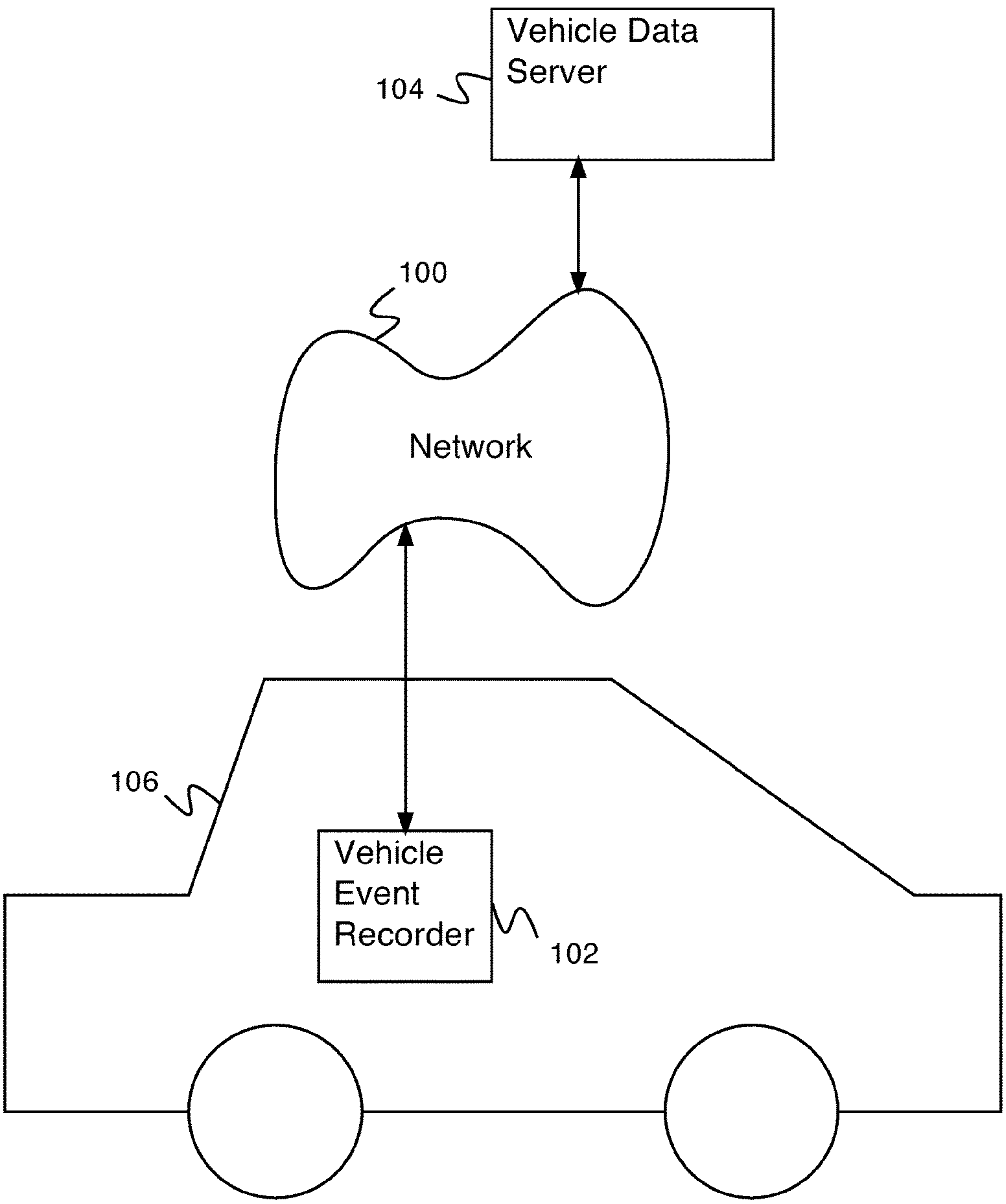
FIG. 1 is a block diagram illustrating an embodiment of a system including a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term ‘processor’ refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Server determined bandwidth saving in transmission of events is disclosed. A system for receiving a driving event comprises an interface configured to receive a portion of data regarding a driving event. A system for receiving a driving event comprises a processor configured to determine whether more data regarding the driving event should be requested and, in the event that more data regarding the driving event should be requested, request more data regarding the driving event. The system comprises a memory coupled to the processor and configured to provide the processor with instructions.

A vehicle event recorder system comprises a set of sensors comprising a Global Positioning System (GPS) and a set of map data. The GPS in conjunction with the map data serves to identify the position and speed of the vehicle on a road described in the map data. The map data comprises location-specific legal information for determining whether the vehicle is operating within the law. In some embodiments, the map data comprising location-specific legal information is provided to the manufacturer of the vehicle event recorder by a third party (e.g., by a map data vendor). In some embodiments, the location-specific legal information includes errors—for example, locations where indicated speed limit information differs from the actual speed limit (e.g., the legal default speed limit or the posted speed limit) or locations where a stop sign is indicated but none exists. Errors in stored location-specific legal information can lead to a vehicle operating according to the law being flagged for a violation in error. This raises costs when a violation is detected, the capture and transmission of a video recording is triggered, needlessly incurring costs to the owner of the vehicle event recorder system (e.g., cost of transmission, cost of storage on the recorder, cost of reviewing the event, etc.).

FIG. 1 is a block diagram illustrating an embodiment of a system including a vehicle event recorder. In the example shown, vehicle event recorder 102 comprises a vehicle event recorder mounted in a vehicle (e.g., a car or truck). Vehicle event recorder 102 comprises a set of sensors—for example, video recorders, audio recorders, accelerometers, gyroscopes, vehicle state sensors, GPS, outdoor temperature sensors, moisture sensors, laser line tracker sensors, or any other appropriate sensors. In various embodiments, vehicle state sensors comprise a speedometer, an accelerator pedal sensor, a brake pedal sensor, an engine revolution per minute (RPM) sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, or any other appropriate vehicle state sensors. In some embodiments, vehicle event recorder 102 receives sensor data or vehicle state sensor data from an on-board vehicle sensor. Vehicle event recorder 102 comprises map data. In some embodiments, vehicle event recorder 102 comprises a system for processing sensor data and detecting events. In some embodiments, vehicle event recorder 102 comprises a system for detecting risky behavior. In some embodiments, vehicle event recorder 102 comprises a system for detecting speed limit violation events. In some embodiments, vehicle event recorder 102 comprises a system for detecting stop sign violation events. Vehicle event recorder 102 comprises a system for saving bandwidth in transmission of events. In various embodiments, vehicle event recorder 102 is mounted on vehicle 106 in one of the following locations: the chassis, the front grill, the dashboard, the rear-view mirror, or any other appropriate location. In some embodiments, vehicle event recorder 102 comprises multiple units mounted in different locations in vehicle 106. In some embodiments, vehicle event recorder 102 comprises a communications system for communicating with network 100. In some embodiments, vehicle event recorder 102 comprises a system for transmitting vehicle event recorder data. In various embodiments, network 100 comprises a wireless network, a wired network, a cellular network, a local area network, a wide area network, the Internet, or any other appropriate network. Vehicle event recorder 102 communicates with vehicle data server 104 via network 100. Vehicle event recorder 102 is mounted on vehicle 106. In various embodiments, vehicle 106 comprises a car, a truck, a commercial vehicle, or any other appropriate vehicle type. Vehicle data server 104 comprises a vehicle data server for collecting events and risky behavior detected by vehicle event recorder 102. In some embodiments, vehicle data server 104 comprises a system for collecting data from multiple vehicle event recorders. In some embodiments, vehicle data server 104 comprises a system for analyzing vehicle event recorder data. In some embodiments, vehicle data server 104 comprises a system for displaying vehicle event recorder data.

In some embodiments, vehicle data server 104 receives a portion of data regarding a driving event. Vehicle data server 104 determines, based at least in part on the portion of data, whether the rest of the data should be indicated to be transmitted. For example, the portion of data includes information regarding the driving event location and the triggering criteria. The driving event location, in some cases, includes a location of legal information (e.g., a stop sign, a speed limit, etc.), and that the trigger of the driving event is associated with the legal information of the location (e.g., not stopping at the stop sign, speeding, etc.). The legal information and the driving event are analyzed for the location and used to determine whether or not more information is desired (e.g., a legitimate event because the legal information regarding the location is reliable or not reliable—for example, because the legal information regarding the location is not correct). In some embodiments, a database of exceptions—for example, criteria under which detected events should be ignored—is used in determining whether or not more information is desired. In various embodiments, the database of exceptions comprises locations for which the actual speed limit (e.g., the legal default speed limit or the posted speed limit) is known to be different from the speed limit recorded in location-specific legal information database 218, instances where a stop sign indicated in location-specific legal information 218 is known not to exist, regions for which a given customer has declared it is not interested in receiving exceptions, modifications of legal requirements a customer is interested in following (e.g., only record an event when a driver is more than 5 MPH over the speed limit), or any other appropriate exceptions. In some embodiments, in the event that the server receives information regarding a violation event, it checks the event against the database of exceptions. In various embodiments, in the event that the event detector determines a violation event has been identified incorrectly using the database of exceptions, the event and any associated images and/or video are indicated to be deleted from event storage 224, the event and any associated images and/or video are soft deleted from event storage 224, or the event and any associated images and/or video are modified in any other appropriate way. In some embodiments, soft deleting the event and any associated images and/or video comprises marking the event and any associated images and/or video for deletion but not removing them from storage until the storage space is required for other data.

Figure 2:
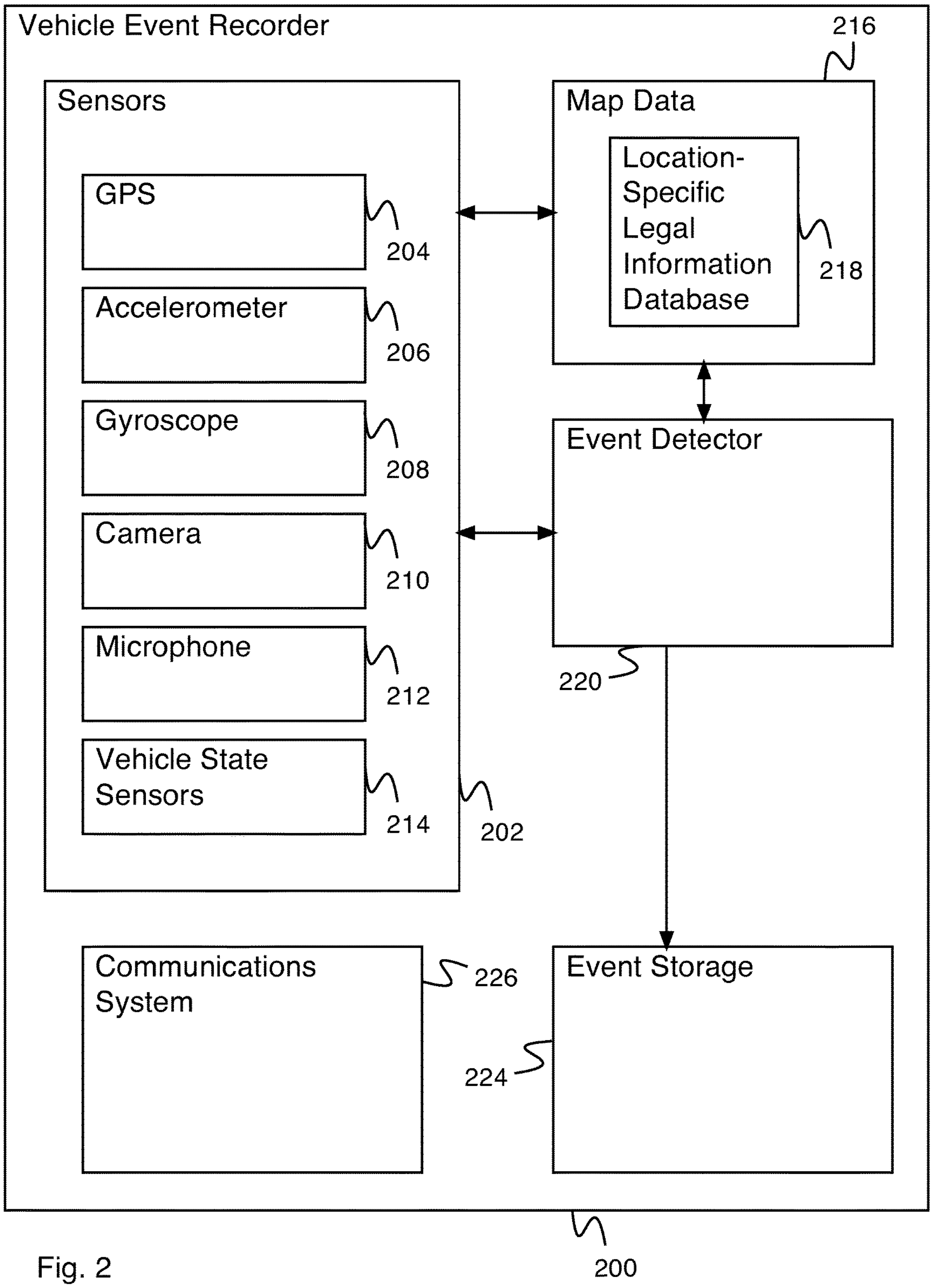
FIG. 2 is a block diagram illustrating an embodiment of a vehicle event recorder.

FIG. 2 is a block diagram illustrating an embodiment of a vehicle event recorder. In some embodiments, vehicle event recorder 200 of FIG. 2 comprises vehicle event recorder 102 of FIG. 1. In the example shown, vehicle event recorder 200 comprises sensors 202. Sensors 202 comprises GPS 204, accelerometer 206, gyroscope 208, camera 210, microphone 212, and vehicle state sensors 214. In various embodiments, sensors 202 additionally comprises outdoor temperature sensors, moisture sensors, laser line tracker sensors, or any other appropriate sensors. In various embodiments, vehicle state sensors 214 comprise a speedometer, an accelerator pedal sensor, a brake pedal sensor, an engine RPM sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, or any other appropriate vehicle state sensors. In some embodiments, vehicle state sensors 214 communicate via an OBD (on-board diagnostics) bus (e.g., on-board diagnostic bus of standard J1979, J1939, J1708, or J1587). Sensors 202 communicates with map data 216. In some embodiments, GPS 204 communicates with map data 216. In some embodiments, GPS 204 in conjunction with map data 216 can accurately report vehicle speed. In various embodiments, vehicle speed is determined by GPS 204, by a speedometer (e.g., by a speedometer of vehicle state sensors 214), by accelerometer 206, or by any other appropriate sensor or combination of sensors. Map data 216 comprises location-specific legal information database 218. In some embodiments, location-specific legal information database 218 comprises a database of location-specific legal information. In some embodiments, map data 216 with location-specific legal information database 218 are supplied by a third party vendor. In some embodiments, location-specific legal information database 218 has errors (e.g., map regions for which the speed limit differs from the actual speed limit, an incorrectly placed stop sign, etc.).

Event detector 220 communicates with sensors 202 and map data 216. In some embodiments, event detector 220 receives sensor data from sensors 202. In some embodiments, event detector 220 detects events using sensor data from sensors 202. In some embodiments, an interface receives sensor data from sensors and a processor processes the sensor data to determine whether an event has been detected. Event detector 220 receives map and speed limit information from map data 216. In some embodiments, event detector 220 uses map and speed limit information from map data 216 in conjunction with GPS data from sensors 202 (e.g., from GPS 204) in order to identify violation events (e.g., events violating legal information indicated in location-specific legal information database 218). In some embodiments, identifying a violating event comprises determining a current map segment. In some embodiments, identifying a violating event comprises determining subsegment information. In some embodiments, when event detector 220 detects a violation event, it records the event. In some embodiments, the event includes an indication of a version or a date of location-specific legal information database 218. In some embodiments, recording the event comprises recording video information. In some embodiments, recording the event comprises recording still picture information. In some embodiments, when event detector 220 detects a violation event, it stores the event in event storage 224. In some embodiments, event detector stores an image from camera 210 in event storage 224 associated with the violation event. In some embodiments, event detector 220 stores video from camera 210 in event storage 224 associated with the violation event. In some embodiments, when event detector 220 uses map and speed limit information from map data 216 in conjunction with GPS data from sensors 202 in order to identify violation events, events are identified incorrectly (e.g., a violation event is identified even though the vehicle is traveling in accordance with the law), due to an error in location-specific legal information database 218.

In some embodiments, vehicle event recorder 200 transmits event information to a vehicle data server (e.g., vehicle data server 104 of FIG. 1). In some embodiments, vehicle event recorder 200 transmits sensor data (e.g., GPS data, camera data, accelerometer data, etc.) to the vehicle data server. In some embodiments, vehicle event recorder 200 communicates with the vehicle data server using communications system 226. In some embodiments, communications system 226 communicates with a network (e.g., network 100 of FIG. 1). In some embodiments, vehicle event recorder 200 transmits a portion of an event to a vehicle data server. In some embodiments, in the event more data is requested by the vehicle data server, more event data is transmitted. In various embodiments, more event data comprises video data, image data, audio data, sensor data, or any other appropriate data. In some embodiments, transmitting more event data only after a request for more data comprises saving bandwidth in transmission of events.

Figure 3:
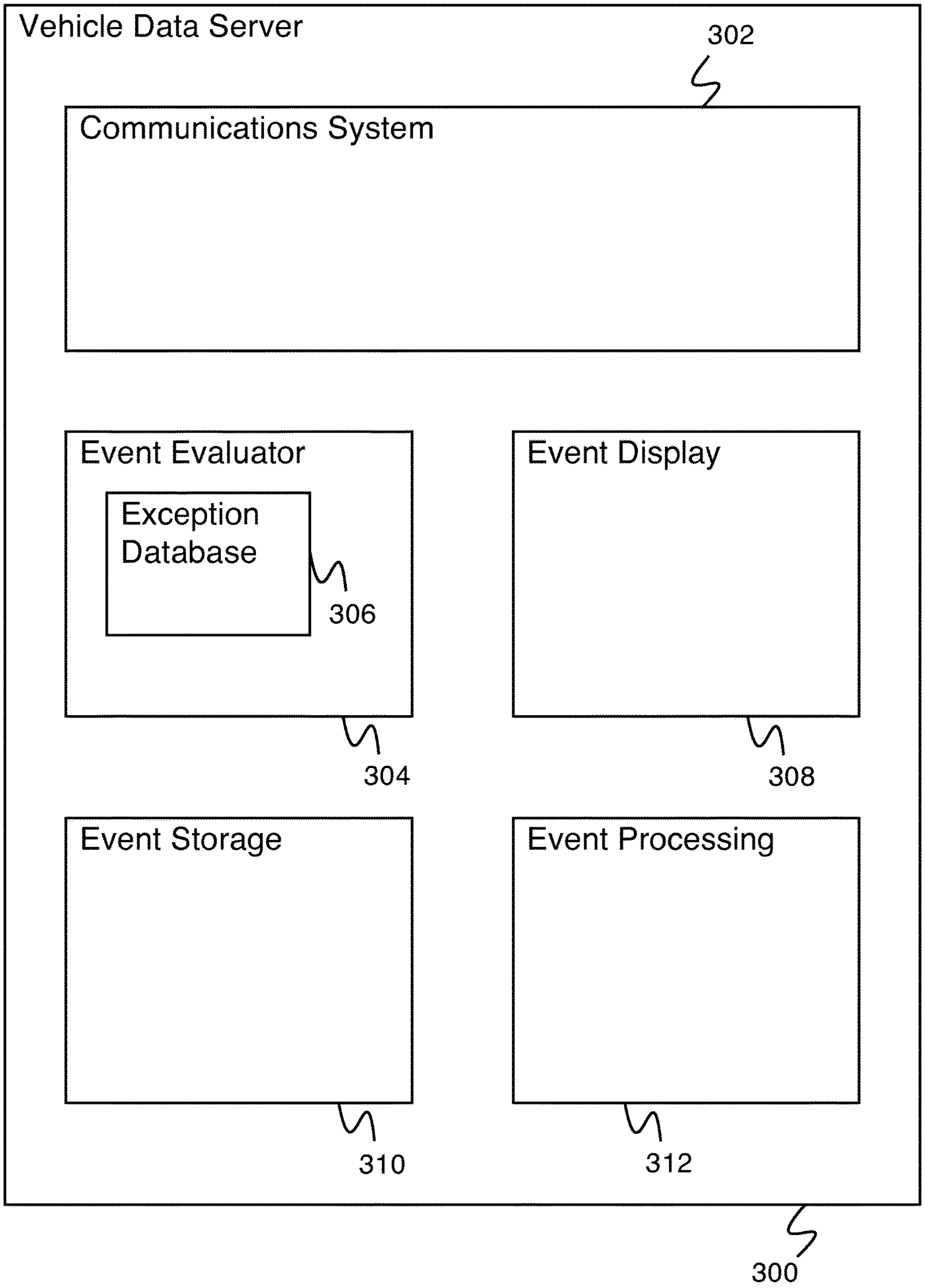
FIG. 3 is a block diagram illustrating an embodiment of a vehicle data server.

FIG. 3 is a block diagram illustrating an embodiment of a vehicle data server. In some embodiments, vehicle data server 300 comprises vehicle data server 104 of FIG. 1. In the example shown, vehicle data server 300 comprises communications system 302. In some embodiments, vehicle data server 300 communicates with one or more vehicle event recorders (e.g., vehicle event recorder 102 of FIG. 1) via communications system 302. In some embodiments, communications system 302 communicates with a network (e.g., network 100 of FIG. 1). A portion of data regarding a driving event is received via communications system 302. In the event that it is determined that the driving event is interesting, more data regarding the driving event is requested via communications system 302. Vehicle data server 300 additionally comprises event evaluator 304. In some embodiments, event evaluator 304 receives a portion of a driving event and determines whether more data regarding the driving event should be requested. In some embodiments event evaluator 304 utilizes exception database 306 in determining whether more data regarding the driving event should be requested. In some embodiments, exception database 306 comprises a set of exceptions. In some embodiments, exception database 306 comprises a set of driving event exceptions. In various embodiments, driving event exceptions comprise location-specific legal information exceptions, customer-specific event exceptions, customer-specific region exceptions, or any other appropriate driving event exceptions. In some embodiments, vehicle data server 300 additionally comprises event display 308 for displaying events. In some embodiments, vehicle data server 300 additionally comprises event storage 310 for storing events. In some embodiments, vehicle data server 300 additionally comprises event processing 312 for processing events.

Figure 4:
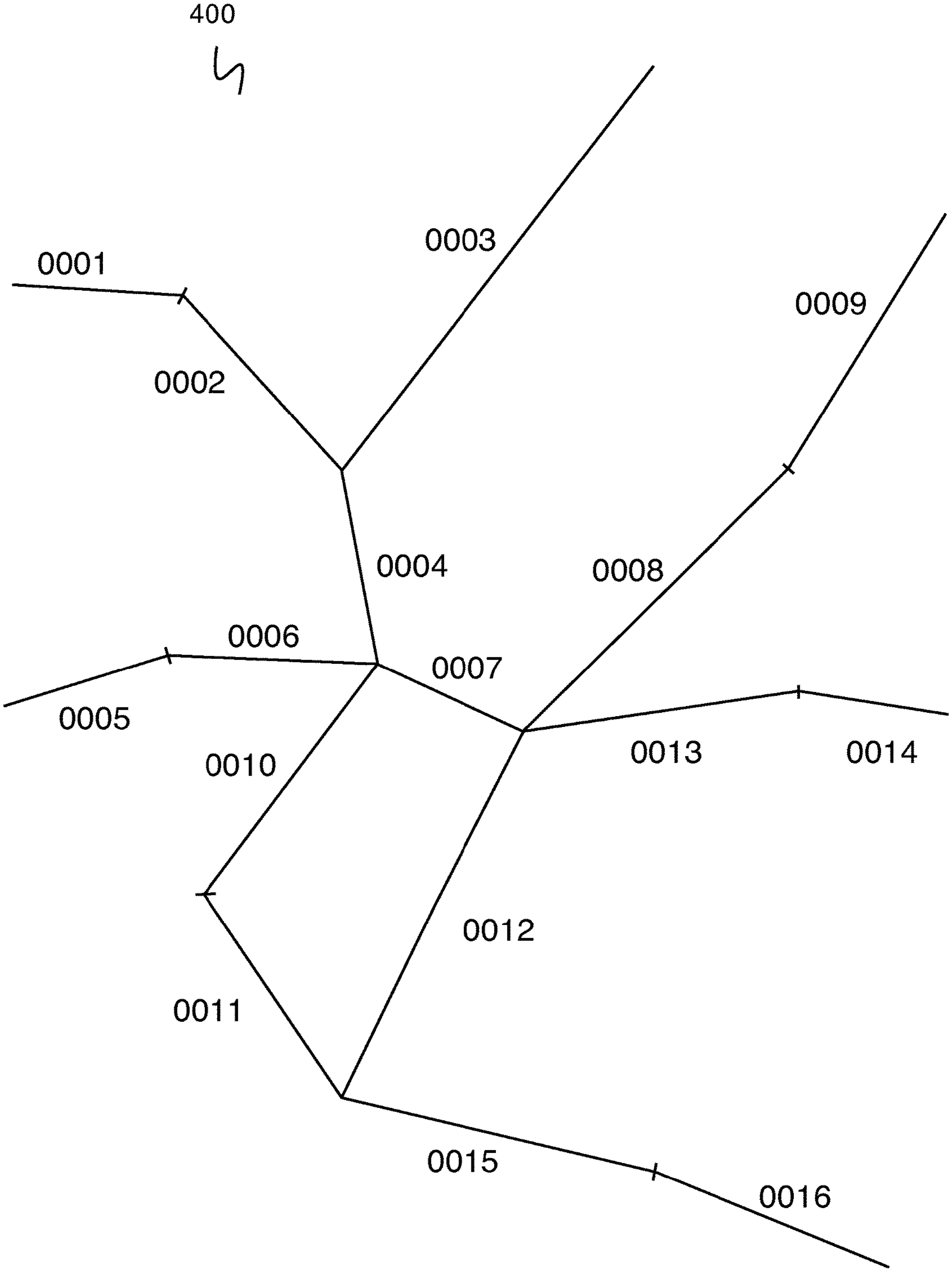
FIG. 4 is a diagram illustrating an embodiment of map segments.

FIG. 4 is a diagram illustrating an embodiment of map segments. In the example shown, map 400 is comprised of 16 segments numbered 0001 through 0016. In some embodiments, each map segment is a straight line. In some embodiments, a curved portion of a road is approximated in the map by one or more map segments. In some embodiments there is a maximum segment length. In various embodiments, the maximum segment length is 100 feet, 2000 feet, 1 mile, 10 miles, or any other appropriate maximum segment length. In some embodiments, a location-specific legal information database (e.g., location-specific legal information database 218 of FIG. 2) stores location-specific legal information data indexed by map segment. In some embodiments, an exception database (e.g., exception database 306 of FIG. 3) stores exception data indexed by map segment. In some embodiments, a location-specific legal information database or an exception database stores data with finer granularity than one data point per segment (e.g., multiple regions within a segment are defined each with associated legal information or exception information).

FIG. 5 is a diagram illustrating an embodiment of an exception database. In some embodiments, exception database 500 comprises exception database 306 of FIG. 3. In the example shown, exception database 500 comprises location-specific legal exceptions 502, customer-specific event exceptions 504, and customer-specific region exceptions 506. In some embodiments, location-specific legal information exceptions 502 comprises a set of exceptions to location-specific legal information (e.g., location-specific legal information from location-specific legal information database 218 of FIG. 2). In some embodiments, location-specific legal information exceptions 502 comprises locations for which location-specific legal information is known to be incorrect. In some embodiments, location-specific legal information exceptions 502 apply to all customers (e.g., to all customers of a vehicle event recorder service provider). In the example shown, a speed limit exception applies to all of segment 007, a speed limit exception applies to miles 10-12 of segment 12, and a stop sign exception exists at mile 15.1 of segment 9. In some embodiments, customer-specific event exceptions 504 comprises a set of exceptions that apply to all events of the indicated types for a specific customer. In some embodiments, customer-specific event exceptions 504 correspond to customer preferences for how events of various types should be handled. In some embodiments, customer-specific event exceptions 504 correspond to increased or reduced thresholds for when events of various types should be detected. In some embodiments, customer-specific event exceptions apply at any location. In the example shown, a speed limit exception is identified, indicating that a speed limit event should only be detected when the measured speed limit is 10 MPH greater than the legal speed limit, and a shock exception is identified, indicating that a shock event should be detected when the measured shock (e.g., measured by accelerometer 206 of FIG. 2) is 15 $m/s^2$ less than the preset threshold. In some embodiments, customer-specific region exceptions 506 comprises a set of exceptions that apply to the given region for a specific customer, for all exceptions of the given type. In some embodiments, customer-specific region exceptions 506 comprises a set of locations for which the customer desires to ignore all exceptions or exceptions of a given type. In the example shown, the customer is not interested in speed exceptions for any of map segment 14, or in any exceptions for mile 15 through the end of map segment 1.

Figure 6:
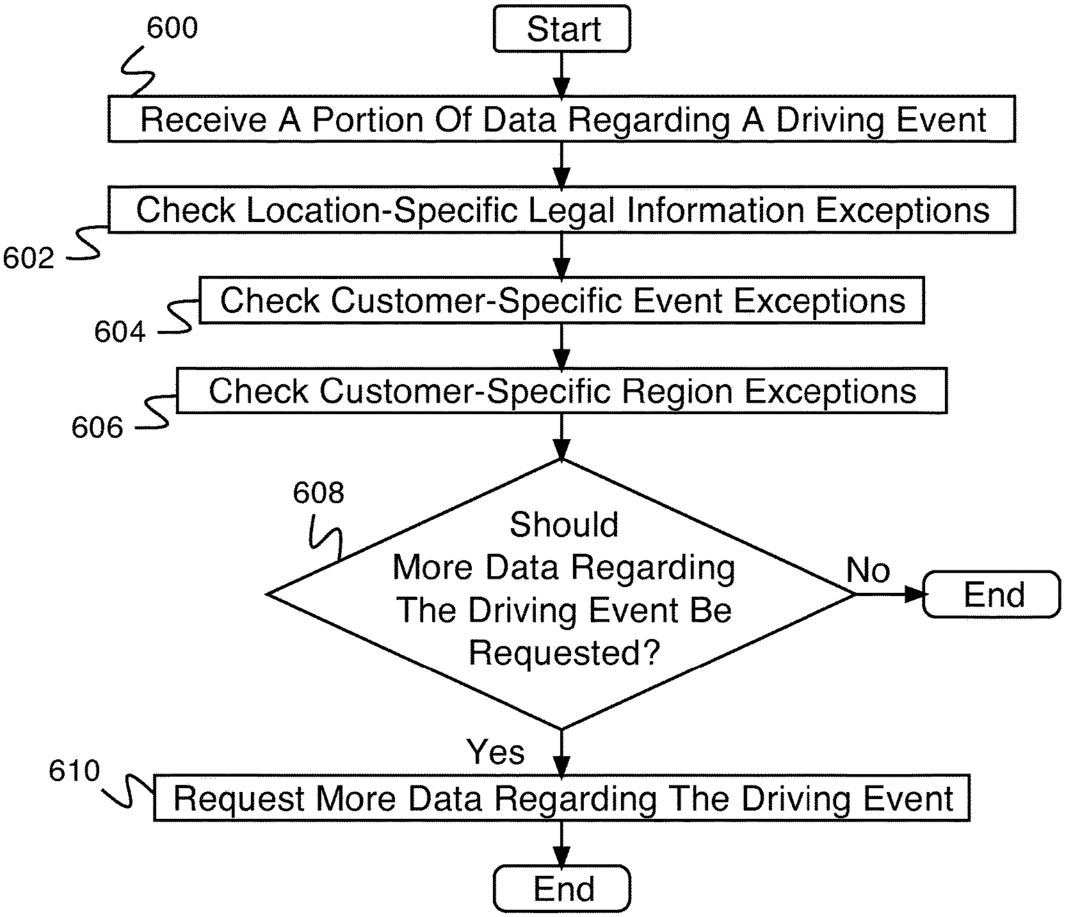
FIG. 6 is a flow diagram illustrating an embodiment of a process for receiving a driving event.

FIG. 6 is a flow diagram illustrating an embodiment of a process for receiving a driving event. In some embodiments, the process of FIG. 6 comprises a process for saving bandwidth in transmission of events. In some embodiments, bandwidth is saved by not requesting more information regarding events that correspond to exceptions. In some embodiments, the process of FIG. 6 is executed by a vehicle data server (e.g., vehicle data server 300 of FIG. 3). In 600 a portion of data regarding a driving event is received. In some embodiments, a portion of data regarding a driving event is received from a vehicle event recorder (e.g., vehicle event recorder 102 of FIG. 1).

In 602, location-specific legal information exceptions (e.g., location-specific legal exceptions 502 of FIG. 5) are checked. For example, it is determined whether a driving event at a location is subject to an exception by looking up the location in an exception database. The database indicates whether at that location there is an exception for specific type of driving event triggers (e.g., a map database includes an indication of a stop sign at a given intersection and the driving event was triggered based on not stopping at the intersection; however, the exception database indicates that there is no stop sign at the intersection so that the driving event was not triggered on a legitimate driving event, or similarly, for speeding in a map mislabeled speed zone, for passing in a map mislabeled no passing zone, etc.). For example, the location is looked up in the database and it is determined whether or not there is an associated exception to the location. Then, it is determined whether any exception associated with the location matches a driving event data or driving event trigger. In the event that there is a match between the driving event data and the exception, then it is indicated that the exception applies. In some embodiments, the exception applying determines that the full driving event data (e.g., complete data for the driving event including video, audio, sensor data, etc.) is not to be transmitted and/or stored and/or indicated to be deleted and an indication is sent to the event recorder to indicate this.

In 604, customer-specific event exceptions (e.g., customer-specific event exceptions 504 of FIG. 5) are checked. For example, it is determined whether a driving event at a location is subject to an exception by looking up the customer in an exception database. The database indicates whether the customer has indicated that there is an exception for specific type of driving event triggers (e.g., a customer has indicated that rolling stops are not to be included in driving events, a customer has indicated that speeding events less than 10 miles per hour over the limit are not to be included in driving events, a customer has indicated that passing in a no passing zone are not to be included in driving events, etc.). For example, the location is looked up in the database and it is determined whether or not there is an associated exception to the location. Then, it is determined whether any exception associated with the location matches a driving event data or driving event trigger. In the event that there is a match between the driving event data and the exception, then it is indicated that the exception applies. In some embodiments, the exception applying determines that the full driving event data (e.g., complete data for the driving event including video, audio, sensor data, etc.) is not to be transmitted and/or stored and/or indicated to be deleted and an indication is sent to the event recorder to indicate this.

In 606, customer-specific region exceptions (e.g., customer-specific region exceptions 506 of FIG. 4) are checked. For example, it is determined whether a driving event in a region is subject to an exception by looking up the customer in an exception database. The database indicates whether the customer has indicated that there is an exception for driving event triggers in a region (e.g., a customer has indicated any events in a region of remote dessert are not to be included in driving events, a customer has indicated that parking in a no parking area in the downtown are not to be included in driving events, a customer has indicated that speeding less than 5 miles per hour in a non-school region is not to be included in driving events, etc.). For example, the location is looked up in the database and it is determined whether or not there is an associated exception to the location. Then, it is determined whether any exception associated with the location matches a driving event data or driving event trigger. In the event that there is a match between the driving event data and the exception, then it is indicated that the exception applies. In some embodiments, the exception applying determines that the full driving event data (e.g., complete data for the driving event including video, audio, sensor data, etc.) is not to be transmitted and/or stored and/or indicated to be deleted and an indication is sent to the event recorder to indicate this.

In 608, it is determined if more data regarding the driving event should be requested. In some embodiments, it is determined that more data regarding the driving event should be requested if the event does not correspond to any of the exceptions checked (e.g., the exceptions checked in 602, 604, and 606). In the event that more data regarding the driving event should not be requested, the process ends. In some embodiments, in the event that more data regarding the driving event should not be requested, an indication that more data is not requested is transmitted. In some embodiments, the indication comprises an indication that the event should be deleted. In some embodiments, the indication comprises an indication that the event should be soft deleted. In various embodiments, soft deleting an event comprises marking it for later deletion, deleting a reference to the event, moving it to a soft delete partition, or soft deleting it in any other appropriate way. In some embodiments, the indication comprises an indication that the event should be marked as not transmitted. In some embodiments, the indication comprises an indication that the event should be marked as deleted. If it is determined in 608 that more data regarding the driving event should be requested, control passes to 610. In 610, more data regarding the driving event is requested. In some embodiments, the event is requested to be marked that it has been checked against the exception database. In some embodiments, the event is requested to be marked with an indication of the version or date of the exception database. In various embodiments, more data regarding the driving event comprises video data, image data, audio data, sensor data, or any other appropriate data.

In some embodiments, a non-transmitting criteria comprises an exception indication. In some embodiments, the exception indication is based on a location specific legal data. In various embodiments, the location specific legal data comprises one of the following: a speed limit error, a stop sign error, a parking zone error, railroad crossing error, or any other appropriate data.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A system for receiving a driving event, comprising:
an interface configured to receive a portion of data regarding a driving event from a vehicle event recorder attached to a vehicle; and
a processor configured to:
determine whether more data regarding the driving event should be requested from the vehicle event recorder, wherein the determination that more data should be requested is based at least in part on a set of exceptions in an exception database, wherein the set of exceptions comprise one or more of the following: location-specific legal information exceptions, customer-specific event exceptions, or customer-specific region exceptions, wherein customer-specific event exceptions comprises driving event trigger exceptions defined by a specific customer of the vehicle event recorder; and
in the event that more data regarding the driving event should be requested, request more data from the vehicle event recorder regarding the driving event; and
a memory coupled to the processor and configured to provide the processor with instructions.

2. A system as in claim 1, wherein the processor is further configured to:
in the event that more data regarding the driving event should not be requested:
indicate that the data regarding the driving event is to be deleted.

3. A system as in claim 1, wherein the processor is further configured to:
in the event that more data regarding the driving event should not be requested:
indicate that the data regarding the driving event is to be soft deleted.

4. A system as in claim 1, wherein the processor is further configured to:
in the event that more data regarding the driving event should not be requested:
indicate that the data regarding the driving event is to be marked as not transmitted.

5. A system as in claim 1, wherein the processor is further configured to:
in the event that more data regarding the driving event should not be requested:
indicate that the data regarding the driving event is to be marked as deleted.

6. A system as in claim 1, wherein customer-specific event exceptions comprises driving event trigger exceptions defined by a specific customer of the vehicle event recorder.

7. A system as in claim 1, wherein customer-specific event exceptions comprises driving event triggers defined by a customer of the vehicle event recorder that more data should not be requested.

8. A system as in claim 1, wherein customer-specific region exceptions comprises regions where a specific customer of the vehicle event recorder has defined that more data should not be requested.

9. A system as in claim 1, wherein the data regarding the driving event includes video information or still picture information.

10. A system as in claim 1, wherein the processor is further configured to determine a current segment.

11. A system as in claim 1, wherein the processor is further configured to determine subsegment information.

12. A system as in claim 1, wherein the processor is further configured to:
in the event that more data regarding the driving event should be requested, mark that the driving event has been checked against the exception database.

13. A system as in claim 12, wherein the driving event is marked with an indication of a version or date of the exception database.

14. A system as in claim 1, wherein the data regarding the driving event includes an indication of a version or date of the exception database.

15. A system as in claim 1, wherein non-transmitting criteria used by the processor for determining whether more data regarding the driving event should be requested comprises the set of exceptions.

16. A system as in claim 1, wherein the location specific legal exceptions comprise one or more of the following: a speed limit error, a stop sign error, a parking zone error, or a railroad crossing error.

17. A method for receiving a driving event, comprising:
receiving a portion of data regarding a driving event from a vehicle event recorder attached to a vehicle;
determining, using a processor, whether more data regarding the driving event should be requested from the vehicle event recorder, wherein the determination that more data should be requested is based at least in part on a set of exceptions in an exception database, wherein the set of exceptions comprise one or more of the following: location-specific legal information exceptions, customer-specific event exceptions, or customer-specific region exceptions, wherein customer-specific event exceptions comprises driving event trigger exceptions defined by a specific customer of the vehicle event recorder; and
in the event that more data regarding the driving event should be requested, requesting more data from the vehicle event recorder regarding the driving event.

18. A computer program product for receiving a driving event, the computer program product being embodied in a non-transitory computer readable storage medium and comprising computer instructions for:
receiving a portion of data regarding a driving event from a vehicle event recorder attached to a vehicle;
determining whether more data regarding the driving event should be requested from the vehicle event recorder, wherein the determination that more data should be requested is based at least in part on a set of exceptions in an exception database, wherein the set of exceptions comprise one or more of the following: location-specific legal information exceptions, customer-specific event exceptions, or customer-specific region exceptions, wherein customer-specific event exceptions comprises driving event trigger exceptions defined by a specific customer of the vehicle event recorder; and
in the event that more data regarding the driving event should be requested, requesting more data from the vehicle event recorder regarding the driving event.

* * * * *